United States Patent
Yamamoto et al.

(10) Patent No.: US 8,345,001 B2
(45) Date of Patent: Jan. 1, 2013

(54) INFORMATION PROCESSING SYSTEM, ENTERTAINMENT SYSTEM, AND INFORMATION PROCESSING SYSTEM INPUT ACCEPTING METHOD

(75) Inventors: Masami Yamamoto, Tokyo (JP); Nobuhito Kuramochi, Tokyo (JP); Akira Imagawa, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 570 days.

(21) Appl. No.: 10/585,465

(22) PCT Filed: Jan. 5, 2005

(86) PCT No.: PCT/JP2005/000038
§ 371 (c)(1),
(2), (4) Date: Dec. 18, 2006

(87) PCT Pub. No.: WO2005/065798
PCT Pub. Date: Jul. 21, 2005

(65) Prior Publication Data
US 2009/0174652 A1    Jul. 9, 2009

(30) Foreign Application Priority Data

Jan. 6, 2004  (JP) ................................ 2004-000876
Apr. 19, 2004  (JP) ................................ 2004-122975

(51) Int. Cl.
*G06F 3/033* (2006.01)
(52) U.S. Cl. ..................... 345/157; 156/158; 382/103
(58) Field of Classification Search .................. 345/156, 345/501, 157, 158, 520, 522; 463/7, 36–38; 382/77, 100, 103, 168
See application file for complete search history.

(56) References Cited

U.S. PATENT DOCUMENTS

| 6,160,899 A * | 12/2000 | Lee et al. ...................... 382/103 |
| 7,331,856 B1 * | 2/2008 | Nakamura et al. ................. 463/7 |
| 2002/0097247 A1 * | 7/2002 | Ohba ............................ 345/501 |

FOREIGN PATENT DOCUMENTS

| JP | 07-281666 | 10/1995 |
| JP | 2000-010696 | 1/2000 |
| JP | 2001-321564 | 11/2001 |
| JP | 2002-196855 | 7/2002 |

OTHER PUBLICATIONS

PCT/ISA/210 International Search Report for corresponding PCT application PCT/JP2005/000038, dated Apr. 19, 2005.

* cited by examiner

*Primary Examiner* — Amare Mengistu
*Assistant Examiner* — Dmitriy Bolotin
(74) *Attorney, Agent, or Firm* — Katten Muchin Rosenman LLP

(57) ABSTRACT

A technique is provided related to an input interface wherein entertainment is enhanced by an information processing system that includes means for producing a computer image that prompts a player to virtually touch a plurality of touch points; means for accepting input of a video image of the player captured by image pickup means; display control means for causing a display device to display and superimpose the video image and the computer image on each other; means for analyzing the video image during display of the computer image to detect virtual touches of any of the plurality of touch points; and means for executing predetermined processing when the detecting means detects virtual touches that are performed on a predetermined number of touch points in a predetermined order.

14 Claims, 13 Drawing Sheets

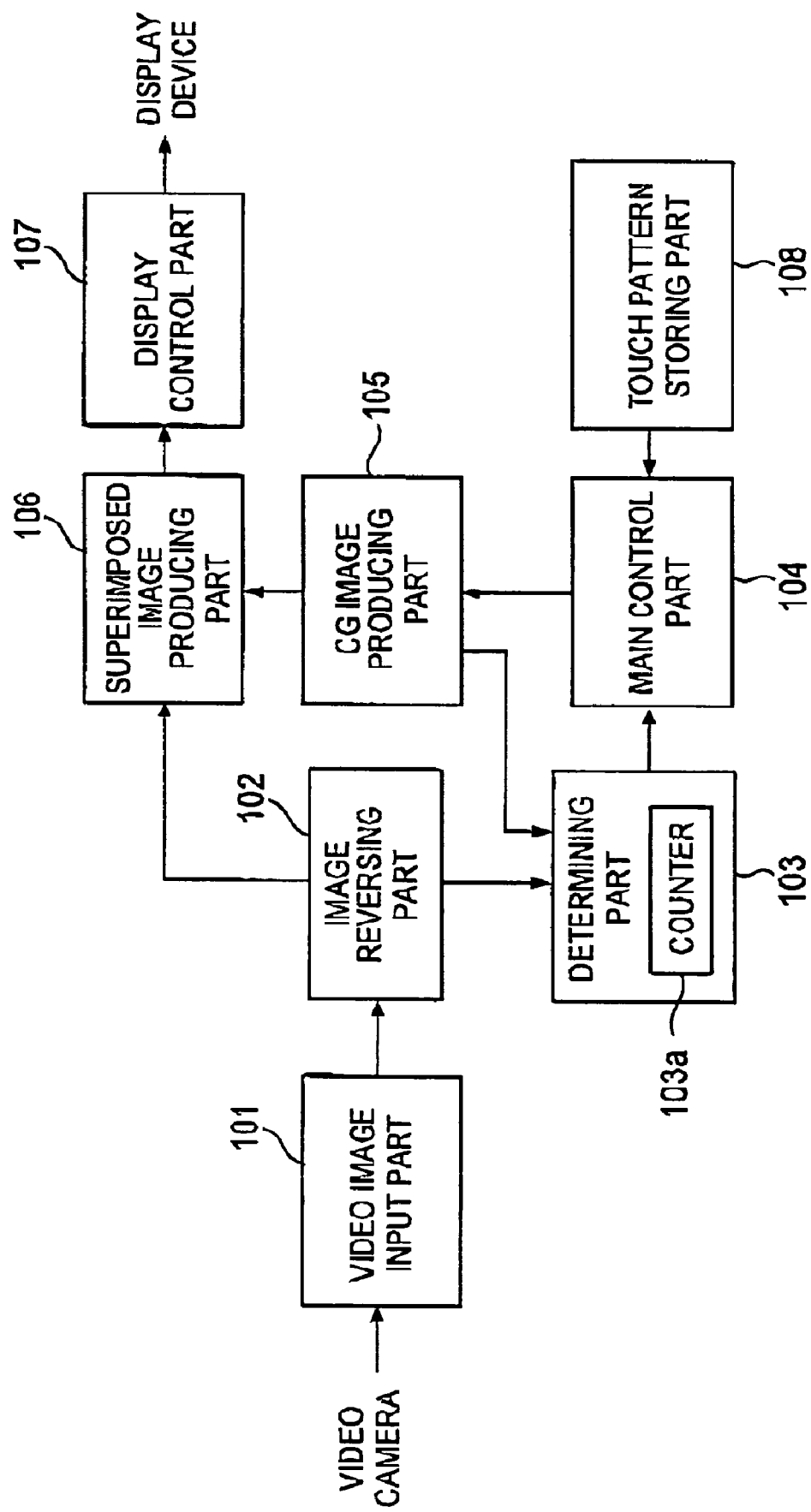

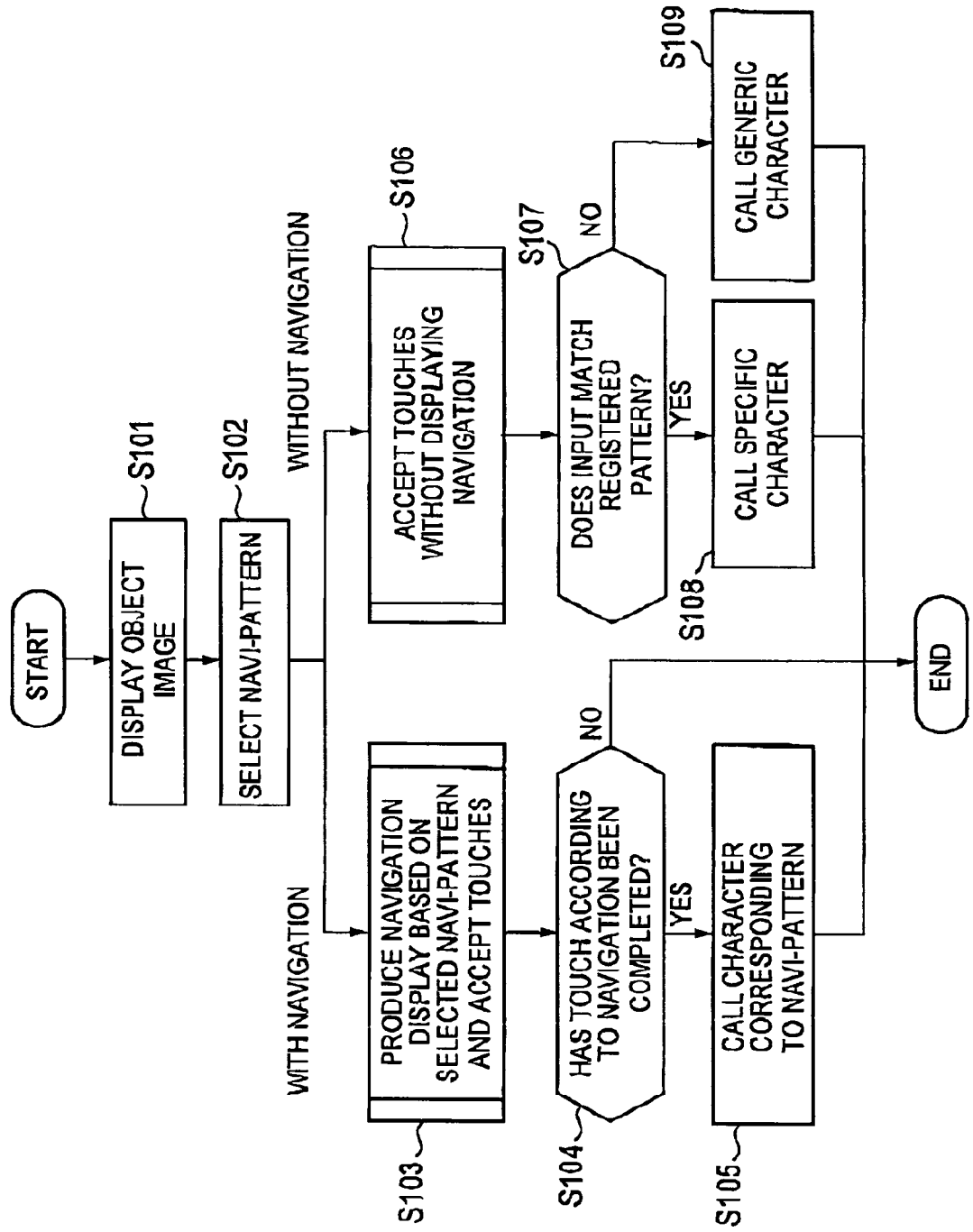

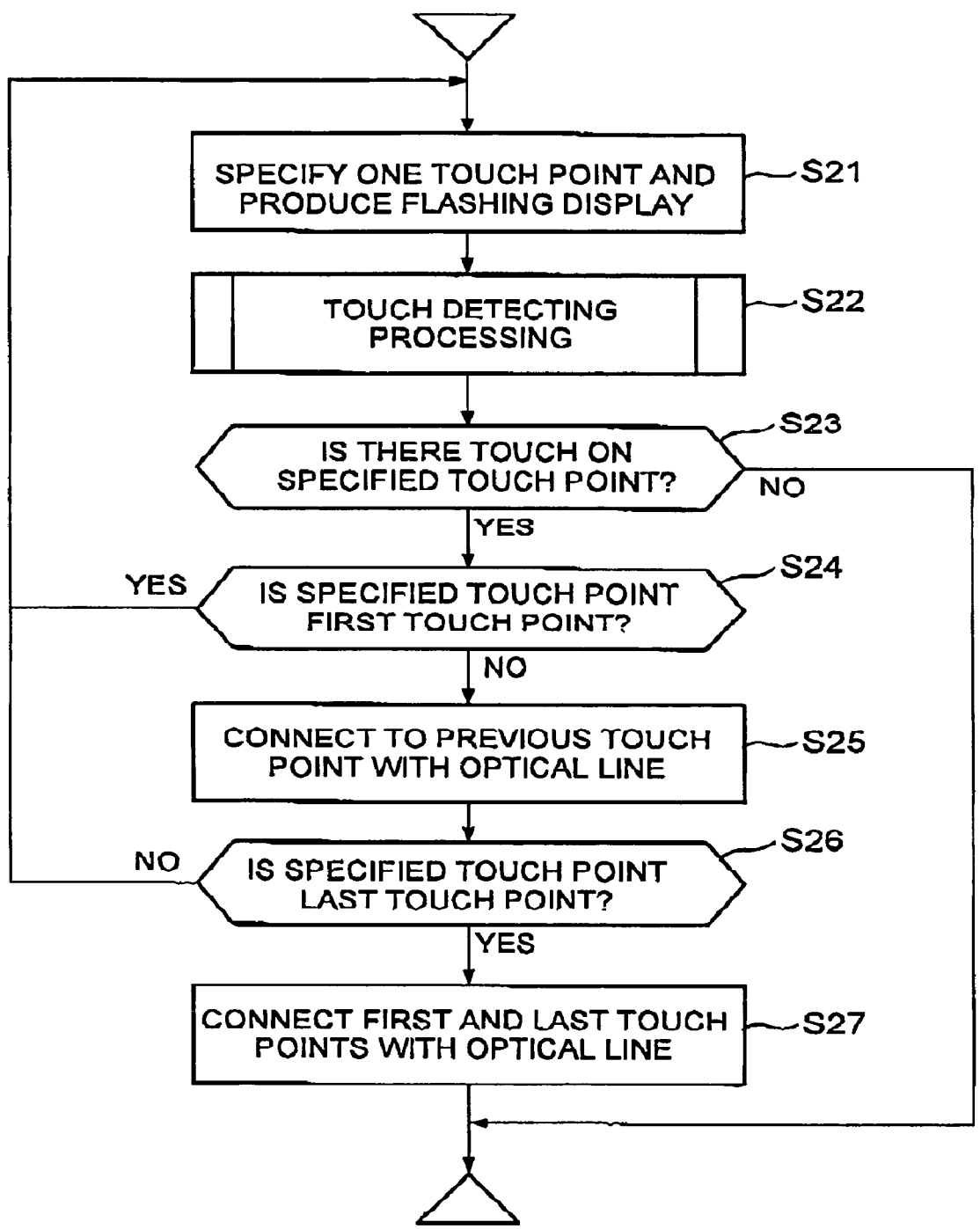

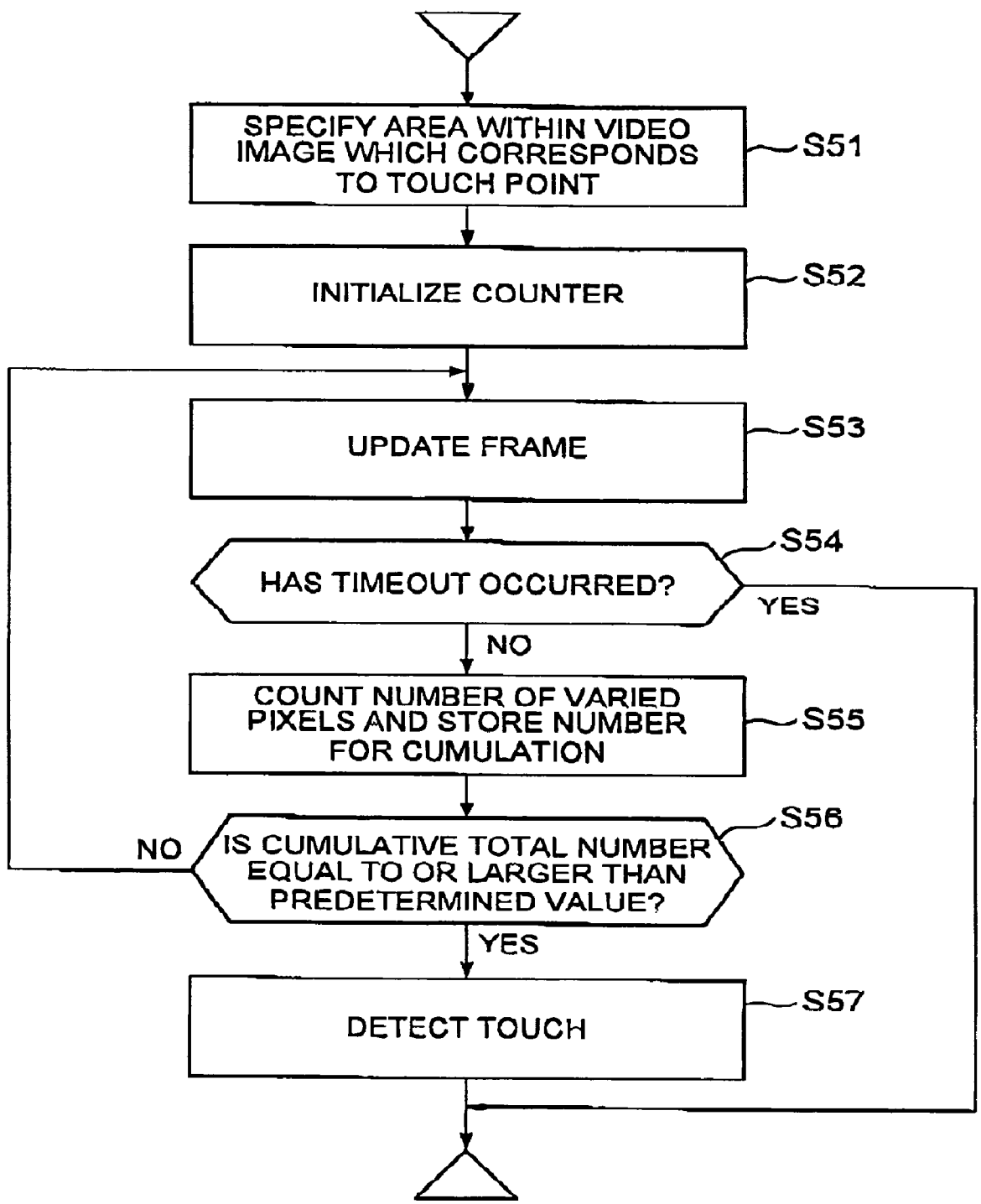

SINGLE NAVIGATION (FOR CASE OF TOUCH PATTERN 12→4→7)

LIGHTNING NAVIGATION
(FOR CASE OF TOUCH PATTERN 12→4→7)

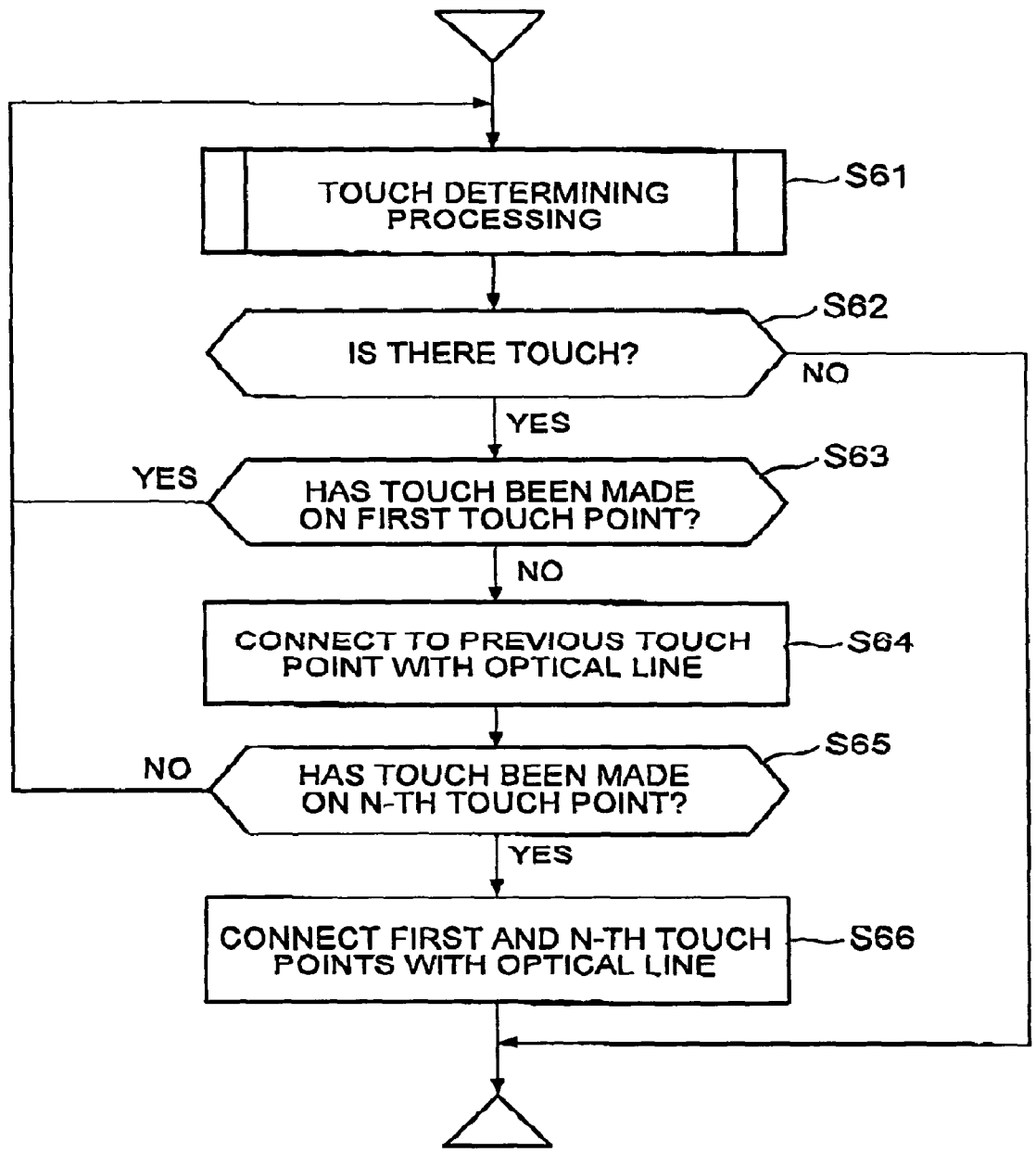

INFORMATION PROCESSING SYSTEM, ENTERTAINMENT SYSTEM, AND INFORMATION PROCESSING SYSTEM INPUT ACCEPTING METHOD

This application is a National Phase Application of International Application No. PCT/JP2005/000038, filed Jan. 5, 2005, which claims priority under 35 U.S.C. 119 (a-e) of Japanese Patent Application No.: 2004-000876 filed Jan. 6, 2004 and Japanese Application No. 2004-122975 filed Apr. 19, 2004, which is herein incorporated by reference.

TECHNICAL FIELD

The present invention relates to an interface of an information processing system, for accepting input from a player who is using the system, and more particularly, to an interface that uses a video image picked up by a camera.

BACKGROUND ART

JP 2002-196855 A (Patent Document 1) discloses an image processor which uses an image picked up by a camera as an input interface.

DISCLOSURE OF THE INVENTION

The image processor disclosed in Patent Document 1 is applicable to an input interface of an information processing system or an entertainment system. In an application thereof in the information processing system or the entertainment system, it is possible to enhance the value of an entire system by enhancing the entertainment thereof.

In view of the above, the present invention has as an object the provision of a technique relating to an input interface having an enhanced entertainment value.

An information processing system according to one aspect of the present invention includes: means for producing a computer image that prompts a player to virtually touch a plurality of touch points; means for accepting an input of a video image of the player picked up by an image pickup means; display control means for superimposing the video image and the computer image on one another and causing a display device to display a superimposed image; means for analyzing the video image during display of the computer image and detecting virtual touches corresponding to any of the plurality of touch points; and means for executing predetermined processing when the detecting means detects the virtual touches that are made at a predetermined number of touch points in a predetermined order.

According to a preferred aspect of the present invention, the detecting means may be configured to detect the virtual touch when an object having a specific color and worn by the player within the video image overlaps any one of the plurality of touch points within the computer image.

According to a preferred aspect of the present invention, the image producing means sequentially produces computer images including navigation information indicating one touch point to be touched next. The means for executing predetermined processing may then execute the predetermined processing when the detecting means detects that the virtual touches have been made for the respective computer images, including the navigation information, that are sequentially produced.

According to a preferred aspect of the present invention, the image producing means sequentially produces computer images each indicating two touch points to be touched next. The means for executing predetermined processing may then execute the predetermined processing when it is detected by the detecting means that the virtual touches have been made simultaneously on the two touch points for the respective computer images, including the navigation information, that are sequentially produced.

According to a preferred aspect of the present invention, the image producing means produces the computer image including navigation information indicating an order of touches to be made at the touch points. The means for executing predetermined processing may be configured to execute the predetermined processing when the detecting means detects that the virtual touches have been made according to the navigation.

An information processing system according to one aspect of the present invention includes: means for producing a computer image that shows a player a plurality of touch points to be virtually touched; means for accepting input of a video image of the player picked up by an image pickup means: display control means for superimposing the video image and the computer image on one another and causing a display device to display a superimposed image; means for analyzing the video image during display of the computer image and detecting virtual touches corresponding to any of the plurality of touch points; and object displaying means for displaying, when the detecting means detects the virtual touches that are made sequentially on a plurality of touch points, an object in which the touch points, sequentially subjected to the virtual touches, are connected to one another.

An entertainment system according to one aspect of the present invention includes: means for producing a computer image containing an image for specifying a plurality of areas; means for accepting input of a video image picked up by an image pickup means; display control means for superimposing the video image and the computer image on one another and causing a display device to display a superimposed image; and means for analyzing the video image by referring to the computer image, in which: the image producing means selects one area of the plurality of areas in a predetermined order, and sequentially produces a plurality of images each of which prompts the input and is obtained by displaying the selected area in a manner different from other areas; the analyzing means analyzes the video image when an image prompting various inputs is displayed and detects that an area of the video image corresponding to the selected area displayed in the manner different from the other areas, consists of a predetermined image; and a predetermined function is executed when producing of the image that prompts the input, and detecting that the corresponding area consists of the predetermined image, are performed a predetermined number of times.

BRIEF DESCRIPTION OF THE DRAWINGS

FIG. 3 shows a functional configuration of the entertainment device;

FIG. 5 is a flowchart of an entire input accepting process;

FIG. 6 is a flowchart of a touch accepting process for a case of a single navigation;

FIG. 7 is a flowchart showing a touch determining process;

FIG. 8(a) shows a first touch point indicated by flashing;

FIG. 8(b) shows the first touch point and a second touch point that are indicated by flashing;

FIG. 8(c) shows a line connecting the first and second touch points and a last touch point indicated by flashing;

FIG. 8(d) shows the touch points connected by optical lines,

FIG. 10(a) shows first touch points indicated by flashing;

FIG. 10(b) shows the first touch points connected by an optical line, a touch point, and second touch points indicated by flashing;

FIG. 10(c) shows the first touch points connected by an optical line and the second touch points connected by an optical line;

FIG. 12(a) shows all touch points to be touched;

FIG. 12(b) shows a state where a lightning line connecting a first touch point and a second touch point is erased;

FIG. 12(e) shows a state where a lightning line connecting the second touch point and a third touch point is erased;

FIG. 12(d) shows a state where a lightning line connecting the third touch point and the first touch point is erased; and FIG. 13 is a flowchart showing the touch accepting process for a case with no navigation.

BEST MODE FOR CARRYING OUT THE INVENTION

An entertainment system according to an embodiment of the present invention is described below with reference to the accompanying drawings.

Figure 1:
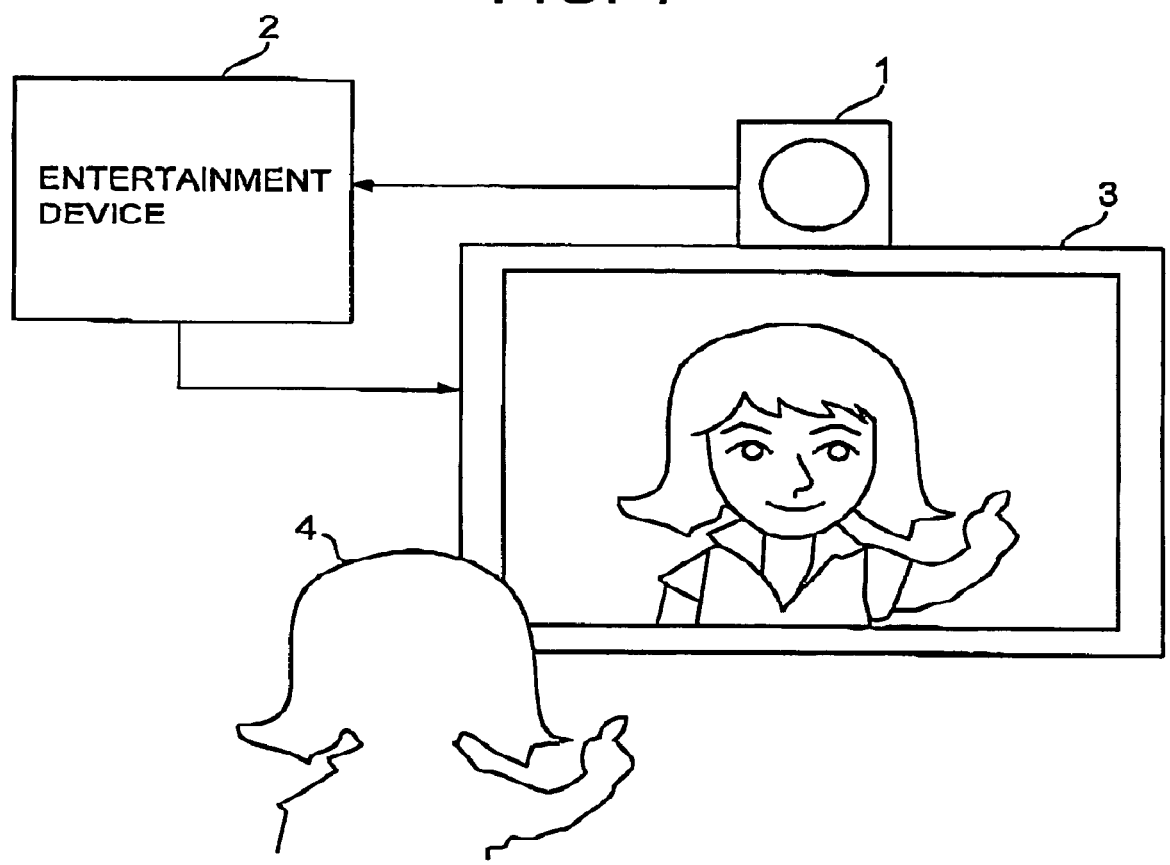
FIG. 1 shows an entire configuration of an entertainment system according to one embodiment of the present invention.

FIG. 1 shows an example of a configuration of the entertainment System according to this embodiment. In the entertainment system, an analog or digital video camera 1 picks up images of a player 4 facing a display device 3, an entertainment device 2 captures resultant moving images therefrom sequentially and continuously, and superimposed images obtained by superimposing computer images (CGs), produced by the entertainment device 2, and mirrored moving images of the video images, captured from the video camera 1, on one another, are displayed on the display device 3 in real time.

Thus, the superimposed images reflect actions of the player 4 in real time, which allows the player 4 to enjoy himself/herself using the superimposed images. The mirrored moving image may be produced by subjecting the moving image captured from the video camera 1 to mirroring processing (right/left revers processing for an image) on the entertainment device 2. Alternatively, the mirrored moving image may be produced by placing a mirror In front of the video camera 1 and using the video camera 1 to pick up a moving image of a mirror surface that reflects an operator. In either case, displayed on the display device 3 is a combined image that changes its display mode according to a movement of a target in real time.

The entertainment device 2 is implemented by a computer that forms the required functions using computer programs.

Figure 2:
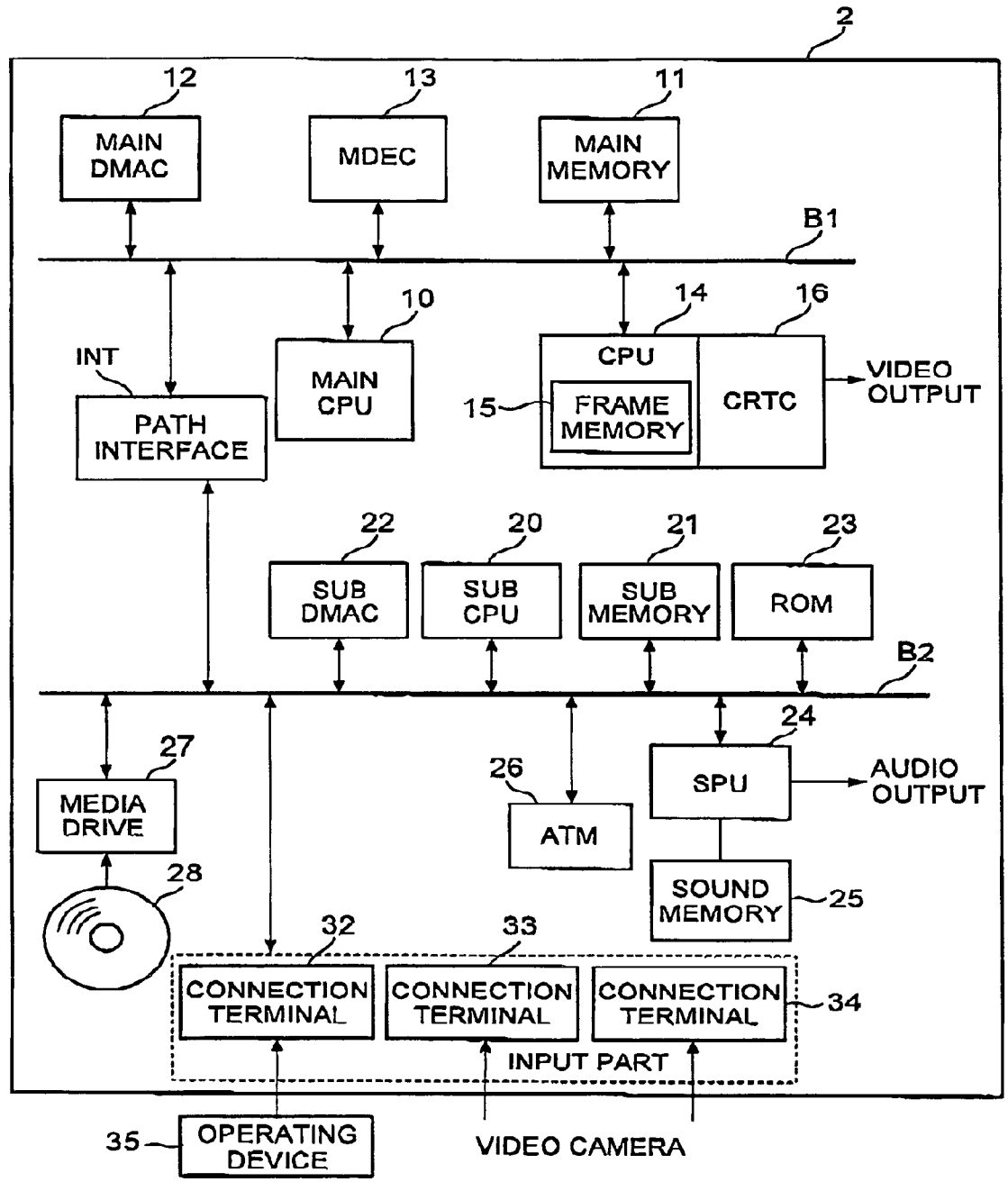
FIG. 2 shows a configuration of an entertainment device.

The computer according to this embodiment whose hardware configuration is shown by way of example in FIG. 2 includes a main bus B1 and a sub-bus B2 to which plural semiconductor devices each having a specific function are connected. These buses B1 and B2 are mutually connected or disconnected via a bus interface INT.

The main bus B1 is connected to a main CPU 10 which is a main semiconductor device, a main memory 11 made up of a RAM, a main DMAC (Direct Memory Access Controller) 12, an MPEG (Moving Picture Experts Group) decoder (MDEC) 13, and a graphic processing unit (hereinafter referred to as "GPU") 14 incorporating a frame memory 15 which serves as a drawing memory. The GPU 14 is connected with a CRTC (CRT controller) 16 for producing a video signal so as to display the data drawn in the frame memory 15 on the display device 3.

The main CPU 10 reads a start program from the ROM 23 on the sub bus B2 at the startup of the computer via the bus interface INT, executes the start program, and operates an operating system. The main CPU 10 also controls the media drive 27, reads an application program or data from the medium 28 mounted on the media drive 27, and stores the read application program or data in the main memory 11. The main CPU 10 further applies geometry processing (coordinate value calculation processing) for expressing a shape, movement, or the like of an object to various data read from the medium 28, for example, three-dimensional object data (coordinate values of vertices (typical points) of a polygon, etc.) made up of a plurality of basic graphics (polygons), and produces a display list containing geometry-processed polygon definition information (specifications of shape and drawing position of the polygon to be used, and type, color, texture, etc. of materials composing the polygon).

The GPU 14 is a semiconductor device having the functions of storing drawing context (drawing data including polygon components), carrying out rendering processing (drawing processing) by reading necessary drawing context according to the display list notified from the main CPU 10, and drawing polygons in the frame memory 15. The frame memory 15 can also be used as a texture memory. Thus, a pixel image in the frame memory can be pasted as texture for a polygon to be drawn.

The main DMAC 12 is a semiconductor device for carrying out DMA transfer control over the circuits connected to the main bus B1, and for carrying out DMA transfer control over the circuits connected to the sub bus B2 according to the condition of the bus interface INT. The MDEC 13 is a semiconductor device that operates in parallel with the CPU 10 and has the function of expanding data compressed in an MPEG (Moving Picture Experts Group) format, a JPEG (Joint Photographic Experts Group) format, or the like.

The sub bus B2 is connected to a sub CPU 20 made up of a microprocessor or the like, a sub memory 21 made up of a RAM, a Sub DMAC 22, a ROM 23 recorded with a control program such as an operating system, a sound processing semiconductor device (SPU (Sound Processing Unit)) 24 for reading sound data stored in the sound memory 25 and outputting the read data as an audio output, a communication control unit (ATM) 26 for transmitting/receiving information to/from an external apparatus via a network (not shown), a media drive 27 for setting a medium 28 such as a CD-ROM or a DVD-ROM, and an input part 31.

The sub CPU 20 carries out various operations according to the control program stored in the ROM 23. The sub DMAC 22 is a semiconductor device that carries out control such as a DMA transfer over the circuits connected to the sub bus B2 only when the bus interface INT separates the main bus B1 and the sub bus B2. The input part 31 is provided with a connection terminal 32 through which an input signal from an operating device 35 is inputted, a connection terminal 33 through which an image signal from a video camera 1 is inputted, and a connection terminal 14 through which a sound signal from the video camera 1 is inputted. Note that in this specification, description will be made only in terms of images, and therefore, description in terms of sounds will be omitted for convenience.

In the computer configured as described above, the main CPU 10, the sub CPU 20, and the GPU 14 read and execute a required computer program from the recording medium such as the ROM 23 and the medium 28, thereby operating as the entertainment device 2.

FIG. 3 shows functional blocks of the entertainment device 2. To be specific, the entertainment device 2 is formed with a video image input part 101, an image reversing part 102, a determining part 103, a main control part 104, a CG image producing part 105, a superimposed image producing part 106, a display control part 107, and a touch pattern storing part 108.

The video image input part 101 captures a video image picked up by the video camera 1. With the video image being a moving image, the video image input part 101 captures images sent from the video camera 1 sequentially.

Figure 4A:
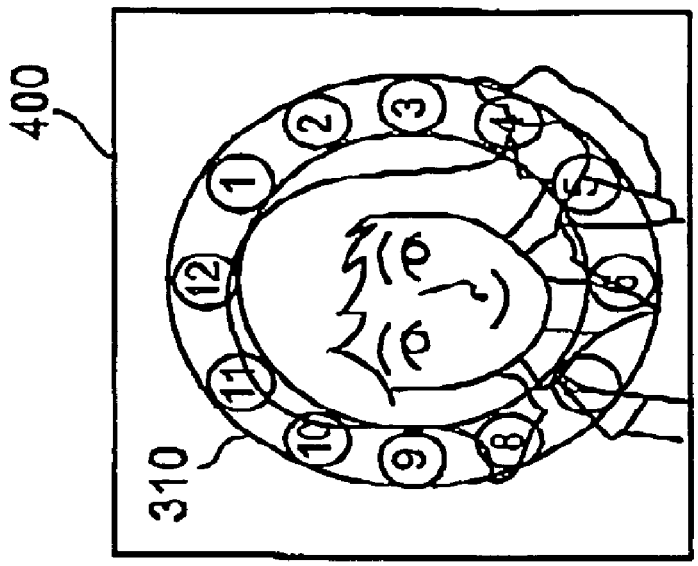
FIG. 4A shows an example of a video image obtained after a mirroring processing.

The image reversing part 102 performs the mirroring processing, that is, the right/left reverse processing on the video image captured by the video image input part 101. FIG. 4A shows a diagram showing an example of a video image 200 obtained by subjecting a picked up image of a player to the mirroring processing. The subsequent processing are performed on the video image that has undergone the mirroring processing.

The main control part 104 controls the entire entertainment system. For example, while the entertainment device 2 is executing a game program, the main control part 104 decides a story of the game based on the program. In addition, the main control part 104 may refer to a determination result of the determining part 103 when the main control part 104 decides the story. Details thereof will be described later.

Figure 4B:
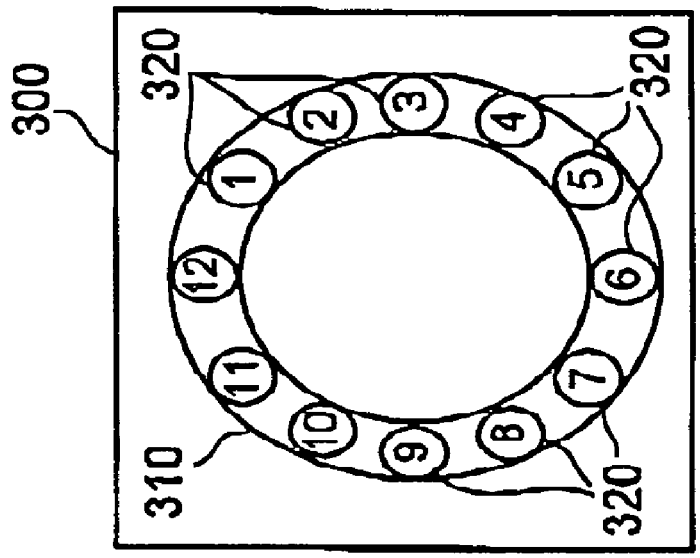
FIG. 4B shows an example of an interface image.

The CG image producing part 105 produces various computer images based on the story of the game according to an instruction issued by the main control part 104. For example, the CG image producing part 105 produces, as shown in FIG. 4B, an interface computer image (interface image) 300 for accepting a request from the player. Herein, the interface image 300 contains an object image 310.

Figure 4C:
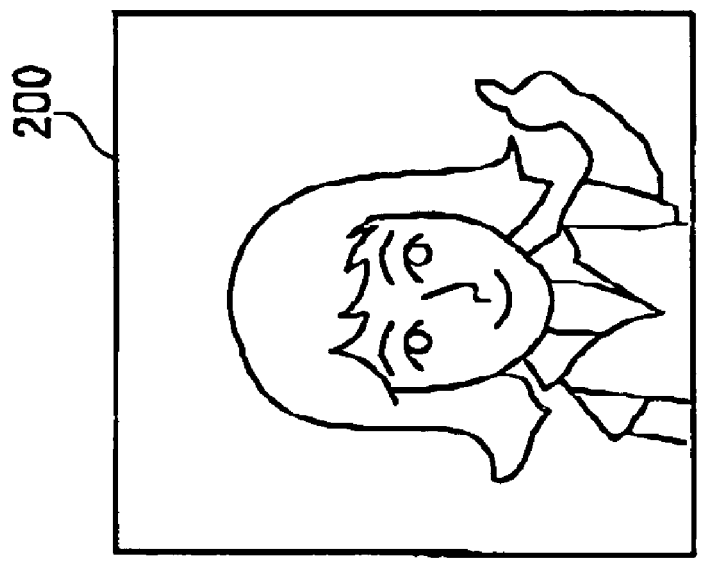
FIG. 4C shows a superimposed image.

The superimposed image producing part 106 produces a superimposed image obtained by superimposing a video image subjected to the mirroring processing by the image reversing part 102 and a computer image produced by the CG image producing part 105. For example, the superimposed image producing part 106 superimposes the video image 200 shown in FIG. 4A and the interface image 300 shown in FIG. 4B on one another, thereby producing a superimposed image 400 shown in FIG. 4C.

The display control part 107 displays the superimposed image produced by the superimposed image producing part 106 on the display device 3.

The touch pattern storing part 108 stores navigation patterns and a specific touch pattern for a case where a touch in accepted without navigation, which are described below. Registration of the navigation patterns and touch pattern may be allowed by the player.

The determining part 103 refers to the interface image 300 captured from the CG image producing part 105, analyzes the video image 200 captured from the image reversing part 102, and determines whether or not the video image 200 is a predetermined image corresponding to the interface image 300. With the video image 200 being a moving image, the determination is processed on a frame basis For example, the determining part 103 obtains a difference between frames and determines whether or not there is a predetermined movement corresponding to the interface image 300. The determining part 103 includes a counter 103a used for calculating the difference between the frames. The counter 103a is capable of counting a plurality of values.

In the example of FIG. 4, the interface image 300 includes a substantially annular object image 310. The object image 310 includes 12 touch points 320 that are arranged substantially in an annular configuration and spaced substantially at regular intervals. Accordingly, in this case, the determining part 103 determines whether or not there is a movement to a predetermined extent or larger in an area of the video image 200 corresponding to one of the touch points 320.

Herein, upon detection of the movement to a predetermined extent or larger in the area of the video image 200 corresponding to one of the touch points 320, the determining part 103 determines that the player has made a virtual touch (hereinafter, referred to simply as "a touch") on the touch point 320. Typical examples in which the touch is determined to have been made include a case where the player acts so as to overlay his/her own hand or the like on the touch point 320 while visually comparing the object image 310 and his/herself image that are shown on the display device 3.

Furthermore, instead of the detection of the movement using the difference between the frames, it may be determined whether or not the touch has been made by determining whether or not a predetermined number of pixels or more of a predetermined color exist in the area corresponding to the touch point 320. Alternatively, the determination may be performed on a movement of a predetermined color by combining detection of a color and detection of a movement. For example, the player may be asked to wear a glove of a specific color (for example, red), and it may be determined that a touch has been made when an image of the glove overlaps the touch point 320 with the number of red pixels within the touch point 320 being equal to or larger than a predetermined number. In addition, it may be determined that a touch has been made when the number of red pixels within the touch point 320 is equal to or larger than the predetermined number, and when a movement to a predetermined extent or larger is detected in the red pixel. Alternatively, it may be determined whether or not the touch has been made by using pattern recognition to detect a movement of an arm, a hand, a fingertip, or the like of the player.

Note that in order to show the player that the action of the player is recognized by the entertainment device 2, a point within the superimposed image 400 at which a detection target such as the glove is detected may be displayed by being increased in brightness or by being highlighted for emphasis. It is desirable that this type of display be carried out, regardless of the vicinity of the area of the touch point 320 but also all over the superimposed image 400.

At this time, by controlling the highlighted display to be faded out, a trail produced when the player moves the glove or the like may be displayed as if to accompany its afterimage, which shows the player more cleaerly that the action of the player is recognized by the entertainment device 2, enhancing the entertainment value.

The main control part 104 decides timing for displaying the object image 310. In order to prompt the player to touch by using the object image 310, the CG image producing part 105 produces a navigation image as described below according to the instruction issued by the main control part 104.

The term "navigation" used here represents guidance to the player as to which touch points are to be touched in which order. Displayed herein is an image with a touch point to be touched by the player being indicated in a mode different from a normal mode (for example, in a flashing display as if shining, in a display with a color different from a normal color, or in a blinking display), which prompts the player to touch. In this embodiment, description will be made of a case where a touch point is displayed flashing for guidance.

Plural patterns are available for the navigation and are stored in the touch pattern storing part 108. Each of navigation patterns (hereinafter, referred to as "navi-patterns") is preset in terms of how many touch points are to be touched in which order.

For example, the navi-patterns include: (1) a first pattern (single navigation) in which the touch points are sequentially made to flash one by one according to a given order of touching; (2) a second pattern (double navigation) in which the touch points are sequentially made to flash two by two according to a given order of touching with every two points simultaneously touched; and (3) a third navigation (lightning navigation) in which all touch points to be touched are simultaneously made to flash along with numbers indicating a given order of touching. Also available is a pattern without a navigation, for accepting touches made by the player according to his/her own will without using navigation.

According to this embodiment, the object image 310 is used to cause the player to make sequential touches. When the player makes touches according to the navigation, the entertainment device 2 accepts the touches as indicating that a predetermined input is complete, and executes a predetermined function. Examples of the predetermined function include calling a character and performing an attack or a defense. Touch patterns may be associated with different functions.

In the case without a navigation, the entertainment device 2 recognizes that a predetermined input has been made when positions of the touch points touched by the player and an order of touching match a touch pattern stored in the touch pattern storing part 108.

Alternatively, a touch point indicating completion of input may be displayed separately so that the input may be recognized as having been made when a touch on the touch point is accepted. Also, it may be natural to accept an instruction notifying completion of input from the operating device 35.

Flowcharts and diagrams showing screen transitions will be used to describe a procedure for an input accepting processing using an image of a player himself/herself which is performed by the entertainment device 2 having the above-mentioned functional configuration. Note that the following example describes a case where the entertainment device 2 performs a character calling processing when accepting input.

First, FIG. 5 shows an entire processing procedure for the input accepting processing. The CG image producing part 105 produces the computer image 300 containing the object image 310 according to the instruction issued by the main control part 104. Then, the superimposed image producing part 106 superimposes the video image 200 (FIG. 4A) obtained from the image reversing part 102 which has undergone the mirroring processing and the interface image 300 (FIG. 4B) on one another, and the superimposed image 400 (FIG. 4C) containing the object image 310 is displayed on the display device 3 (S101). Next, the main control part 104 selects a navi-pattern (S102). Herein, subsequent processing to be taken is different between the case with navigation and the case without navigation.

In the case with navigation, the main control part 104 selects a navi-pattern stored in the touch pattern storing part 108. Then, the entertainment device 2 causes the display device 3 to display navigation according to the selected navi-pattern, and performs processing for accepting touches of the player (S103). The processing will be described later in detail. After that, the main control part 104 determines whether or not the player has made touches according to the navigation and the touches have been made according to the navi-pattern (S104).

Herein, if it is determined that the touches have not been made according to the navi-pattern (S104: No), the input accepting processing ends Meanwhile, if it is determined that the touches have been made according to the navi-pattern (S104: Yes), the main control part 104 executes processing of calling a character corresponding to the navi-pattern (S105).

On the other hand, if "without navigation" is selected in Step S102, the main control part 104 does not instruct to display navigation. With the object image 310 being kept displayed, the player is allowed to make a touch on his/her own will (S106). The processing will be described later in detail.

After the touch accepting processing of Step S106 ends, the main control part 104 refers to the touch pattern storing part 108 to decide whether or not an accepted touch pattern matches a touch pattern registered in advance (S107). Herein, if the pattern in which the player has made touches matches the registered pattern, the main control part 104 performs processing for calling a specific character corresponding to the registered pattern (S108), and if there is no match, performs processing for calling a generic character (S109). This realizes an input interface using the image of a player himself/herself.

Note that the same interface may be used to register a touch pattern. To be specific, the object image 310 displayed on the display device 3 in a registration accepting mode is used to allow the player to make touches on touch points, and a touch pattern defined at that time is stored in the touch pattern storing part 108.

Next, description will be made of a detailed processing of step S103 for accepting the touches made by the player. Herein, the description will focus on the respective navi-patterns of the single navigation, the double navigation, and the lightning navigation.

FIG. 6 shows a flowchart for a case of the single navigation. The main control part 104 specifies a touch point based on the navi-pattern, and causes the touch point to be displayed slashing (S21) (see FIG. 8(*a*)). Subsequently, the determining part 103 performs a determining processing as to whether or not a touch has been made (S22). The touch determining processing will be described later in detail. After the touch determining processing ends, the main control part 104 determines whether or not the touch has been made on a touch point being displayed flashing (S23). If it is determined that there is no touch on the touch point displaying flashing (S23; No), the processing ends. If it is determined that the touch has been made (S23; Yes), it is determined whether or not the touch point is a first touch point (S24). If the touch point is determined to be the first touch point (S24: Yes), the processing returns to Step S21 (see FIGS. 8(*a*) and 8(*b*)). If the touch point is not determined to be the first touch point, i.e., if the touch point is determined to be a second or subsequent touch point, the current touch point and the previous touch point are displayed by being connected to each other with a predetermined object, for example, an optical line (line that appears as if shining) (S25) (see FIGS. 8(b) and 8(c)). Meanwhile, if the current touch point is not determined to be a last touch point, the processing returns to step S21 (S26). If the current touch point is determined to be the last touch point, the last touch point and the first touch point are connected to each other with an optical line (S27) (see FIGS. 8(c) and 8(d)). The single navigation is performed according to the procedure as described above.

Next, description will be made of the touch determining processing of Step S22 with reference to a flowchart of FIG. 7. The determining part 103 analyzes the video image, and specifies an area within the video image which overlaps a position of a touch point being displayed flashing on the interface image (S51). Then, a counter 103a for counting the number of pixels is initialized (S52).

Next, a frame of the video image to be processed is updated (S53). Herein, a time period during which a single touch can be accepted is limited to a predetermined time period. Thus, a timeout occurs when the limited time period is exceeded, which is monitored by the determining part 103 (S54).

If the timeout has occurred (S54: Yes), the processing ends.

If the timeout has not occurred (S54: No), an inter-frame difference is obtained between the current frame and the previous frame of the video image, the number of pixels that have varied in the area specified in Step S51 is counted, and the counted number is cumulatively stored in the counter 103a (S55). Then, it is determined whether or not a cumulative total value of the counted numbers stored in the counter is equal to or larger than a predetermined value (S56). If the cumulative total value is not above the predetermined value (S56: No), Step S53 and the subsequent steps are repeated. If the cumulative total value is above the predetermined value (S56: Yes), the touch is detected (S57).

Note that in the above description, the touch determination is performed by using the inter-frame difference to detect a movement. However, in the case where the player wears a red glove as described above and the touch determination is performed by detecting the color, the number of red pixels may be counted in Step S55, and it may be determined that a touch has been made if the count is equal to or larger than a predetermined number. At this time, in addition, the determination by color and the determination by movement may be combined with each other.

Figure 8:
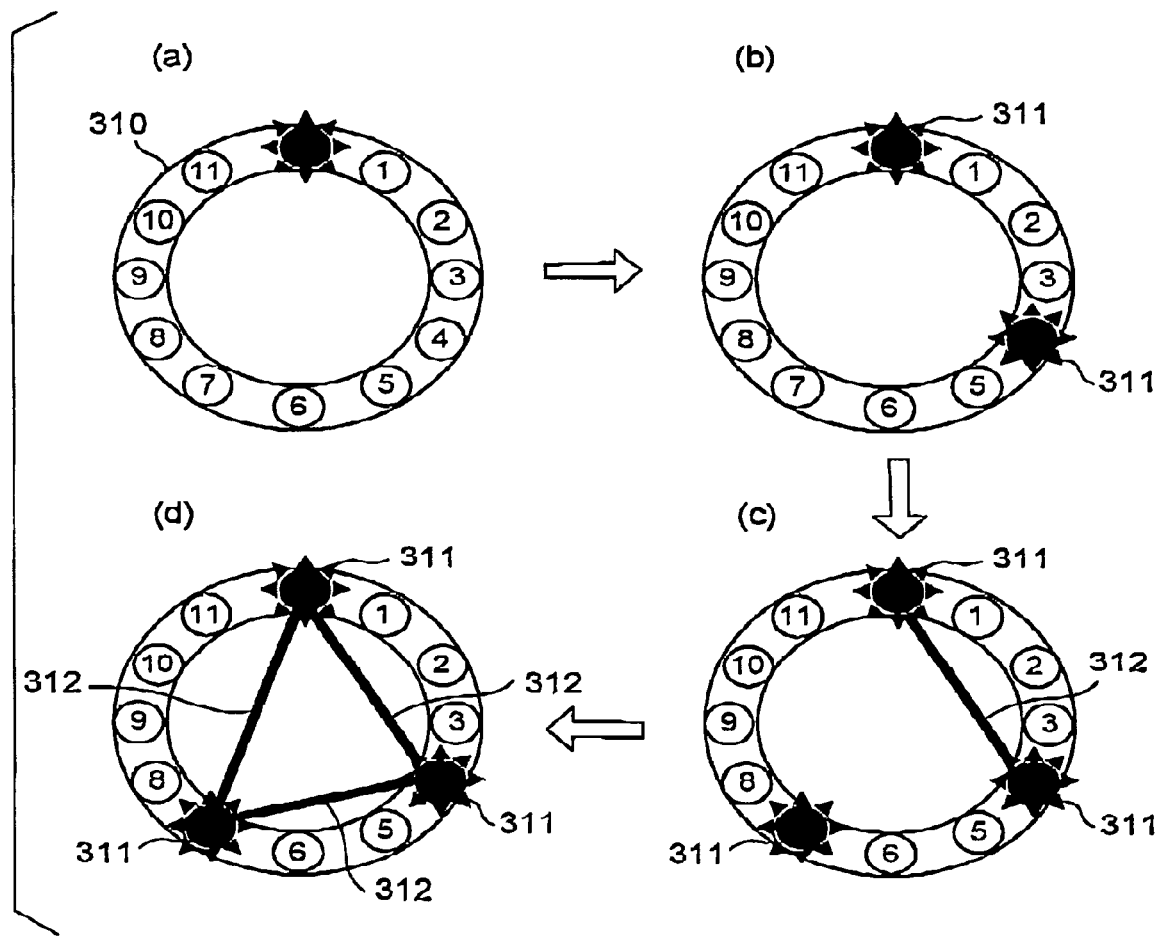
FIG. 8 is a state transition diagram of an object image for the case of the single navigation.

Herein, FIG. 8 will be used to describe how navigation displays are produced in the case of the single navigation. The interface image contains the object image 310. In FIG. 8(a), a flashing display 311 is produced on a first touch point (herein, "touch point 12"). When the touch point 12 is touched in the state of FIG. 8(a), the transition is made to FIG. 8(b), where the flashing display 311 is additionally produced on a second touch point (herein, "touch point 4").

Further, when the touch point 4 is touched in the state of FIG. 8(b), the transition is made to FIG. 8(c), where the first touch point and the second touch point are connected to each other with an optical line 312. Also, the flashing display 311 is additionally produced on a third touch point (herein, "touch point 7").

At this time, as described above, in the case where the trail of the recognized movement of the player is being displayed with its afterimage, the display is produced as if the optical line is overlaid on the afterimage of the trail connecting the touch points, which enhances entertaining effects produced by an input interface. This applies to the double navigation and the like which will be described later.

When the touch point 7 is touched in the state of FIG. 8(c), the transition is made to FIG. 8(d), where the second touch point and the third touch point are connected to each other with the optical line 312. Further, in the example of FIG. 8, the third touch point is the last touch point, so the last touch point and the first touch point 12 are also connected to each other with the optical line 312. With this state, the input acceptance from the player through the single navigation is complete.

Note that in the above description, each time a touch is detected, the detected touch point and the previous touch point are connected to each other with the optical line (S25 and FIG. 8(c)). However, the touch points that have been touched may be connected to one another with the optical lines collectively or sequentially, when the input of the last touch point is finished, instead of each time a touch is detected.

If this case applies, in FIG. 6, the step (S25) is omitted, and the step (S27) is replaced by "connect touch points that have been touched collectively (or sequentially) with the optical lines". Note that in either case, the optical lines are finally displayed as shown in FIG. 8(d).

Figure 9:
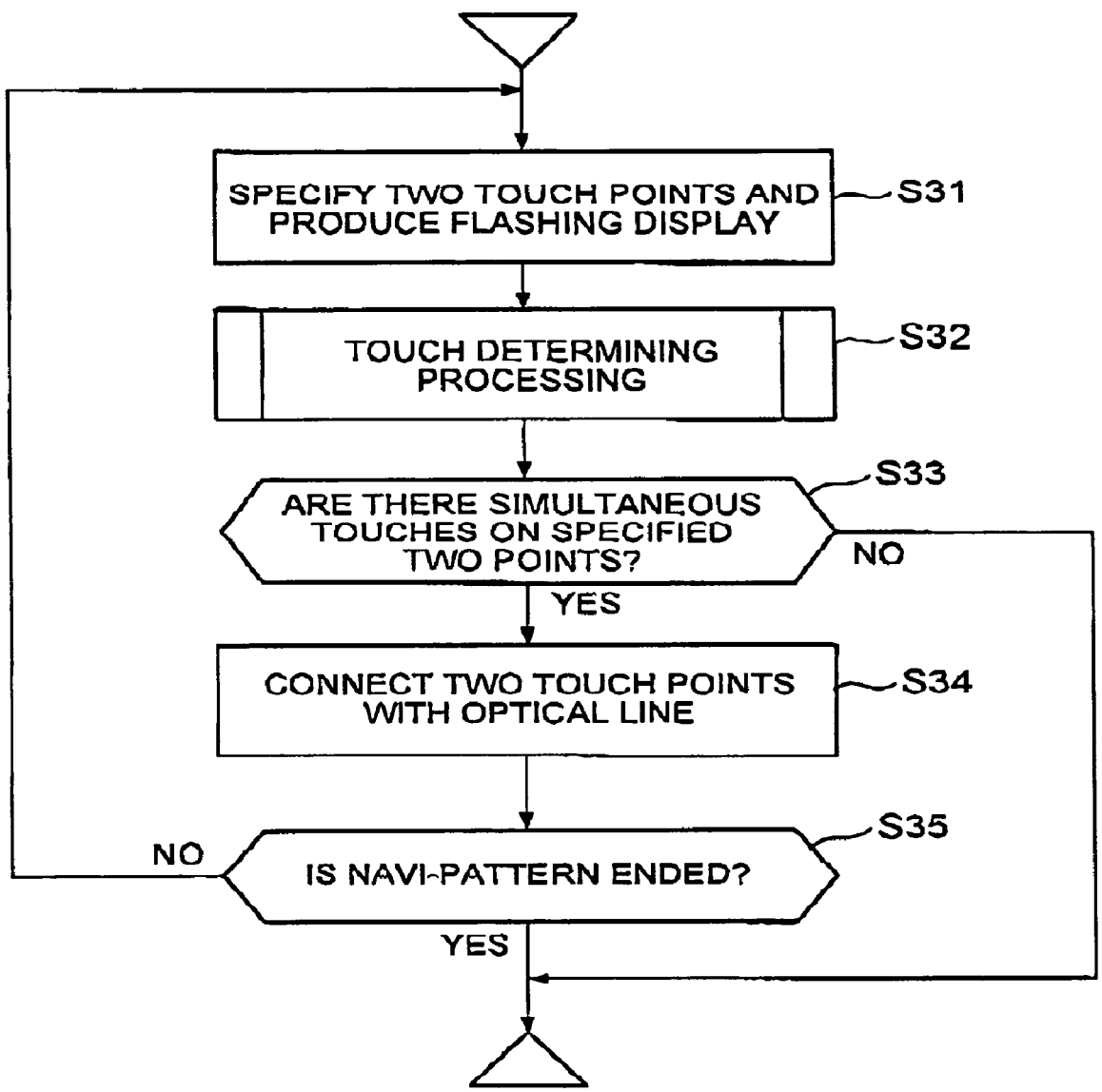
FIG. 9 is a flowchart showing the touch accepting process for a case of a double navigation.

Next, FIG. 9 shows a flowchart of a detailed processing of Step 3103 for a case of the double navigation. The main control part 104 specifies two touch points based on the navi-pattern, and causes the two touch points to be displayed flashing simultaneously (S31) (see FIG. 10(a)). Then, the determining part 103 performs a determining processing as to whether or not a touch has been made on each of the two touch points (S32).

Note that the touch determining processing is performed by subjecting the two touch points to the same processing as shown in FIG. 7.

After the touch determining processing ends, the main control part 104 determines whether or not substantially simultaneous touches have been made on the two touch point being displayed flashing (S33). If it is determined that there is a touch on either or none of the two touch points (s33: No), the processing ends. If it is determined that the touches have been made on both the two points (S33: Yes), the two points that have been touched are connected to each other with the optical line (S34) (see FIGS. 10(a) and 10(b).

Then, the main control part 104 determines whether or not the navi-pattern is complete with all the touch points of the current navi-pattern having been touched (S35). If the navi-pattern is incomplete (S35: No), Step S31 and the subsequent steps are repeated. If the navi-pattern is complete (S35: Yes), the processing ends.

Note that the two touch points are determined to have been simultaneously touched after a touch is made on one of the two touch points and if there is another touch is made on the other point within a predetermined time period. Further, if one of the two points is touched, it may be possible to lower a threshold value for the determination of another touch to be made on the other touch point.

Figure 10:
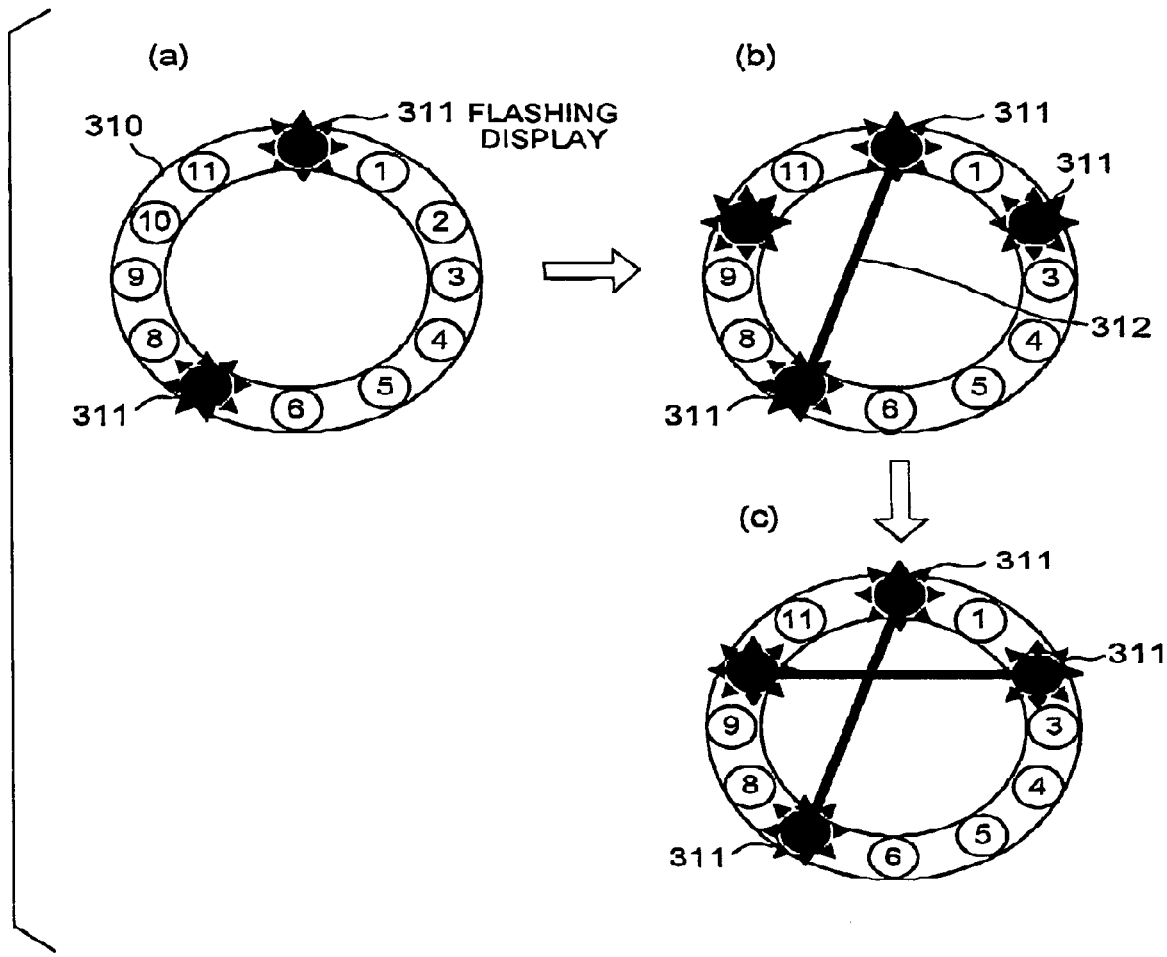
FIG. 10 is a state transition diagram of the object image for the case of the double navigation.

Herein, FIG. 10 will be used to describe how navigation displays are produced in the case or the double navigation. As is the same with the case of FIG. 8, the navigation image contains the object image 310.

In FIG. 10(a), the flashing displays 311 are produced on first touch points (herein, "touch points 7 and 12"). When the touch points 7 and 12 are simultaneously touched in the state of FIG. 10(a), the transition is made to FIG. 10(b). That is, the flashing displays 311 are produced on second touch points (herein, "touch points 2 and 10"), and the first touch points, i.e., the touch points 7 and 12 are connected to each other with the optical line 312.

Further, when the touch points 2 and 10 are simultaneously touched in the state of FIG. 10(b), the transition is made to FIG. 10(c), where the second touch points, i.e., the touch points 2 and 10 are connected to each other with the optical line 312. With this state, the input acceptance from the player through the double navigation is complete.

Also in the case of the double navigation, the respective two touch points may be connected one to another with the optical lines collectively or sequentially, when the input of the last touch point is finished.

Figure 11:
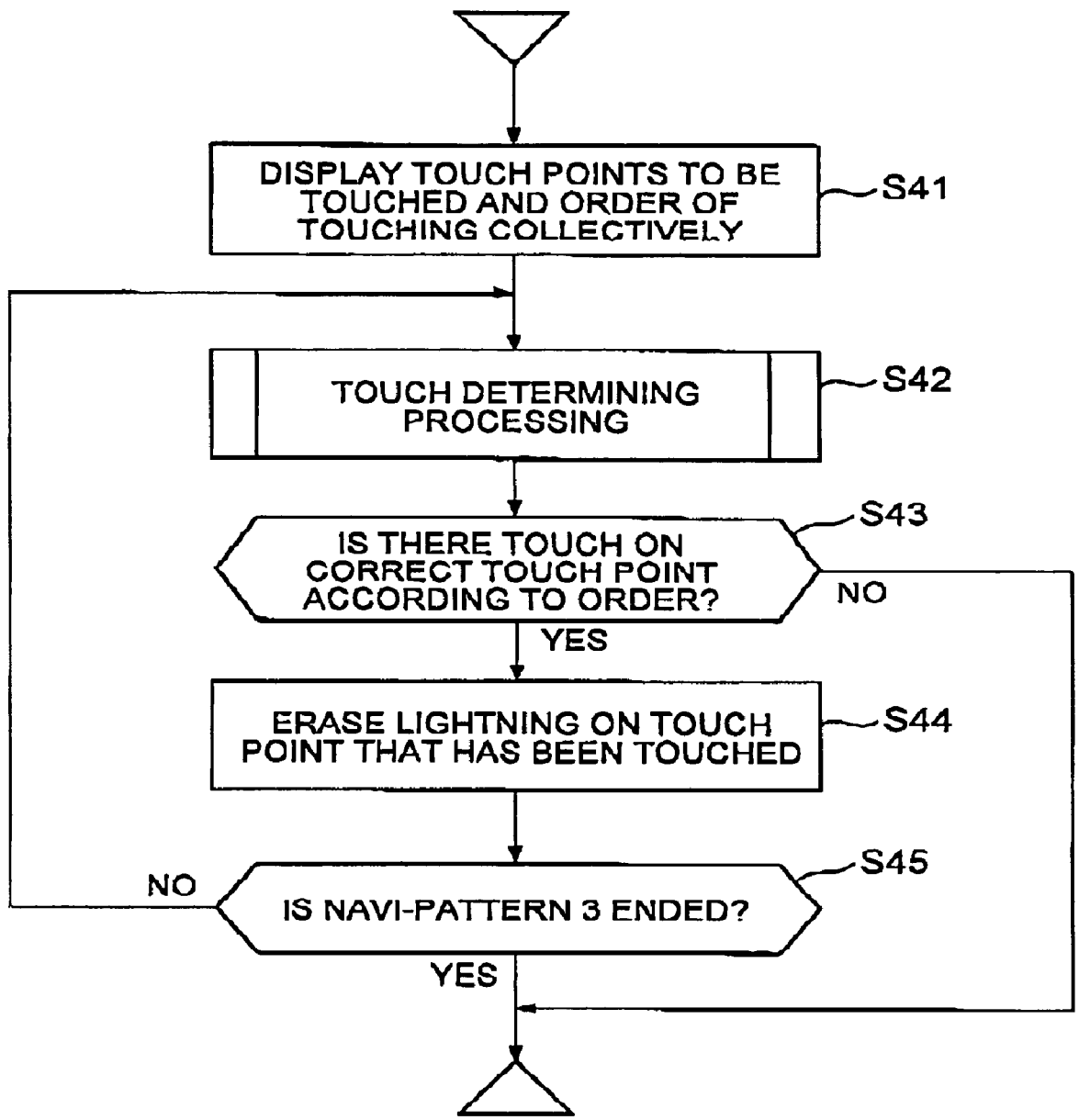
FIG. 11 is a flowchart showing the touch accepting process for a case of a lightning navigation.

Next, FIG. 11 shows a flowchart of derailed processing of Step S103 for a case of the lightning navigation. Based on a navi-pattern, the main control part 104 specifies all touch points included in the navi-pattern and an order of touching.

Then, numbers indicating the order of touching are displayed on the respective touch points, which are displayed flashing. At the same time, the touch points are connected one to another with lightning lines (lines imitating streaks of lightning) (S41) (see FIG. 12(a)).

Subsequently, the determining part 103 performs determining processing as to whether or not a touch has been made (S42). Note that the touch determining processing is the same as that shown in FIG. 7. After the touch determining processing ends, the main control part 104 determines whether or not the touch has been made on a correct touch point according to the order of touching (S43).

If it is determined that the touches have been made out of the order of touching (S43; No), the processing ends. If it is determined that the touch has been made correctly according to the order of touching (S43; Yes), the flashing displays on the touch point that has been touched are disabled, and the lightning line thereon is erased (S44) (see FIGS. 12(b) and 12(c)).

Then, the main control part 104 determines whether or not the navi-pattern is complete with all the touch points of the current navi-pattern having been touched (s45). If the navi-pattern is incomplete (S45: No), Step S41 and the subsequent steps are repeated. If the navi-pattern is complete (S45: Yes), the processing ends.

Figure 12:
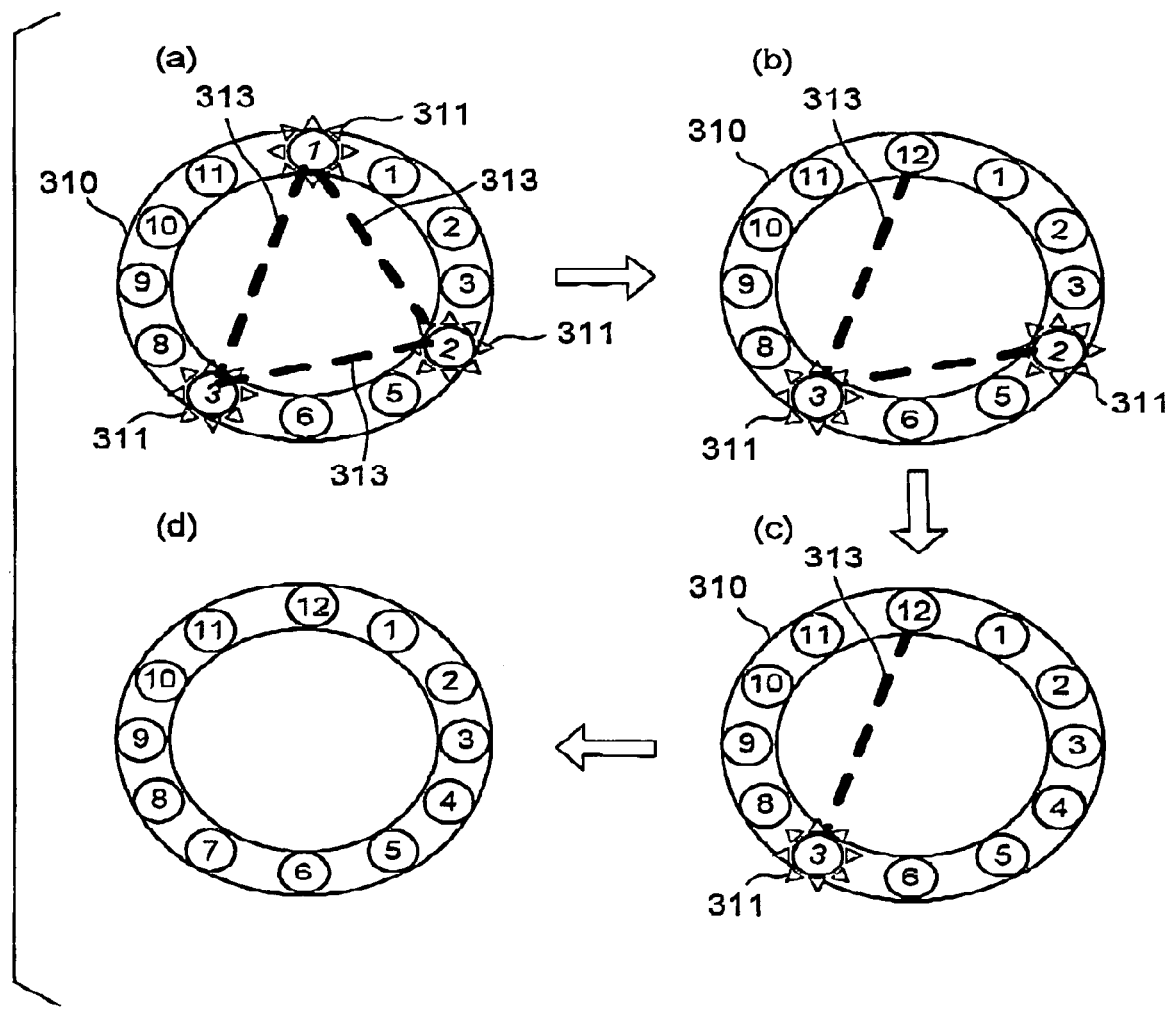
FIG. 12 is a state transition diagram of the object image for the case of the lightning navigation.

Herein, FIG. 12 will be used to describe how navigation displays transit in the case of the lightning navigation. As is the same with the cases of FIGS. 8 and 10, the navigation image contains the object image 310.

In FIG. 12(a), the displays of numbers indicating an order of touching and the flashing displays 311 are produced on all touch points (herein, "touch points 4, 7, and 12") to be touched by the player, the touch points being connected to one another with lightning lines 313.

When the touch point 12 (first touch point) is touched in the state of FIG. 12(a), the transition is made to FIG. 12(b). That is, the flashing display 311 on the first touch point is disabled, and the lightning line connecting the first and second touch points is erased.

When the touch point 4 (second touch point) is touched in the state of FIG. 12(b), the transition is made to FIG. 12(c), where the flashing display on the second touch point is disabled, and the lightning line between the second and third touch points is erased.

When the touch point 7 is touched in the state of FIG. 12(c), the transition is made to FIG. 12(d), where the lightning display on the third touch point is disabled, and the lightning line between the third and first touch points is erased. With this state, the input acceptance from the player through the lightning navigation is complete.

Next, a flowchart shown in FIG. 13 will be used to describe detailed processing of Step S106 of FIG. 5 for a case without navigation. To accept a touch without a navigation, it is detected which touch point touch has been touched (S61). That is, the touch detecting processing of FIG. 7 is performed on all touch points, and when a touch is determined to have been made on any one of the touch points, the processing advances to Step S62.

Processing performed at Step 62 and the subsequent steps is similar to the processing (FIG. 6) for the care of the single navigation. That is, when touches are detected to have been made on a plurality of touch points, the touch points that have been touched are connected to one another with optical lines (S62 to S65). In this case, a total number (N) of touches that can be accepted is predetermined. In other words, after the player has made touches on arbitrary N touch points (S65; Yes), the N-th touch point and the first touch point are connected to each other with an optical line, and the processing ends (S66).

Also in the case without a navigation, the touch points that have been made may be connected one to another with the optical lines collectively or sequentially, when the input of the last touch point is finished.

The above-mentioned embodiment of the present invention is merely an example for explaining the present invention, and the scope of the present invention should not be construed as being limited only to those embodiments. The present invention can be implemented by one skilled in the art in various other modes without departing from the gist of the present invention.

For example, the object image may have a polygonal shape such as a triangle, or various other shapes may apply. A combination thereof may also apply. According to a predetermined rule, the touch points are arranged to be spaced equidistantly (equally) or non-equidistantly (unequally) from each other with respect to the object image. Alternatively, only the touch points may be displayed without the display of the object image, or only the touch points to be touched may be displayed.

The invention claimed is:

1. An information processing system, comprising:
   means for producing a unitary computer image of a plurality of touch points with computer generated prompts guiding a player to virtually touch a computer predetermined plurality of said touch points in a predetermined order;
   means for accepting input of a video image of the player picked up by image pickup means;
   display control means for superimposing the video image and the computer image on one another and causing a display device to display a superimposed image;
   means for analyzing the video image during display of the computer image and detecting a virtual touch to any of the plurality of touch points; and
   means for executing predetermined processing when the detecting means detects that the virtual touches have been made to the predetermined number of touch points in accordance with the computer predetermined order, and
   object displaying means for displaying, when the detecting means detects the virtual touches that are made sequentially to the predetermined number of touch points in accordance with the computer predetermined order, an object that connects the touch points sequentially subjected to the virtual touches.

2. The information processing system according to claim 1, wherein the detecting means detects the virtual touch when an object having a specific color and worn by the player within the video image overlaps any one of the plurality of touch points within the computer image.

3. The information processing system according to claim 1, wherein:

the image producing means sequentially produces predetermined computer images including predetermined navigation information indicating a predetermined one touch point to be touched next; and the means for executing predetermined processing executes the predetermined processing only when the detecting means detects that the virtual touches have been made for the respective predetermined computer images including the predetermined navigation information that is sequentially produced.

4. The information processing system according to claim 1, wherein:

the image producing means sequentially produces predetermined computer images each indicating two predetermined touch points to be touched next; and the means for executing predetermined processing executes the predetermined processing only when the detecting means detects that the virtual touches have been made simultaneously on the predetermined two touch points for the respective computer images including the predetermined navigation information that is sequentially produced.

5. The information processing system according to claim 1, wherein:

the image producing means produce the predetermined computer image including predetermined navigation information indicating the predetermined order of touches to be made to the touch points; and the means for executing predetermined processing executes the predetermined processing only when the detecting means detects that the virtual touches have been made according to the predetermined navigation.

6. An entertainment system, comprising;

means for producing a unitary computer image including a plurality of areas;

means for accepting input of a video image picked up by image pickup means;

display control means for superimposing the video image and the computer image on one another and causing a display device to display a superimposed image; and means for analyzing the video image by referring to the computer image, wherein:

the image producing means selects one area of the plurality of areas in a computer predetermined order, and in a computer predetermined sequence sequentially produces a unitary image with a plurality of areas which provides computer prompts guiding the input in a predetermined manner and is obtained by displaying the selected area in a manner visually different from others;

the analyzing means analyzes the video image when each of the plurality of images, that the computer generates to prompt the video image input in accordance with the computer predetermined manner, is displayed, and detects that an area of the video image, corresponding to the pre-selected area displayed in the manner visually different from others, includes a predetermined image; and a predetermined function is executed when production of the image that prompts the input, and the detection that the corresponding area includes the predetermined image, are performed a predetermined number of times, wherein as the detection that the corresponding area includes the predetermined image occurs the predetermined number of times, an object connecting the area of the video image, corresponding to the pre-selected area displayed in the manner visually different from others, is displayed on the display device.

7. An information processing system input accepting method, comprising:

producing a unitary computer image of a plurality of touch points with computer generated prompts guiding a player to virtually touch a computer predetermined plurality of said touch points in a predetermined order;

accepting input of a video image of the player picked up by image pickup means;

analyzing the video image while superimposing the video image and the computer image on one another and causing a display device to display a superimposed image, and sequentially detecting virtual touches to any of the plurality of touch points;

accepting the virtual touches as predetermined input when the predetermined number of touch points are touched in accordance with the computer predetermined order by the virtual touches; and as the plurality of touch points are touched, generating an object connecting the current touch point to the previous touch point according to the computer predetermined order.

8. A recording medium on which a computer program for accepting input is recorded, the computer program causing a computer to execute processing of:

producing a unitary computer image of a plurality of touch points with computer generated prompts guiding a player to virtually touch a computer predetermined plurality of said touch points in a predetermined order;

accepting an input of a video image of the player picked up by image pickup means;

analyzing the video image while superimposing the video image and the computer image on one another and causing a display device to display a superimposed image, and sequentially detecting virtual touches to any of the plurality of touch points; and accepting the virtual touches as predetermined input when the predetermined number of touch points are touched in accordance with the computer predetermined order by the virtual touches, and as the plurality of touch points are touched, generating an object connecting the current touch point to the previous touch point according to the computer predetermined order.

9. An information processing system, comprising;

means for producing a unitary computer image of a plurality of touch points with computer generated prompts guiding a player to virtually touch a computer predetermined plurality of said touch points in a predetermined order;

means for accepting an input of a video image of the player picked up by image pickup means;

display control means for superimposing the video image and the computer image on one another and causing a display device to display a superimposed image;

means for analyzing the video image during display of the computer image and detecting virtual touches to any of the plurality of touch points; and object displaying means for displaying, when the detecting means detects the virtual touches that are made sequentially to the predetermined number of touch points in accordance with the computer predetermined order, an object that connects the touch points sequentially subjected to the virtual touches.

10. The information processing system according to claim 9, wherein when a virtual touch is made to any one of the touch points, the object displaying means displays the object that connects to another touch point previously subjected to the virtual touch.

11. The information processing system according to claim 9, wherein when the virtual touches are made to the predetermined number of touch points in the predetermined order, the object displaying means displays the object that connects the touch points sequentially subjected to the virtual touches.

12. The information processing system according to claim 9, wherein the object that connects the touch points comprises a line imitating light.

13. A recording medium on which a computer program for accepting an input is recorded, the computer program causing a computer to function as:

means for producing a unitary computer image of a plurality of touch points with computer generated prompts guiding a player to a predetermined plurality of said touch points to be virtually touched in a predetermined order;

means for accepting input of a video image of the player picked up by image pickup means;

display control means for superimposing the video image and the computer image on one another and causing a display device to display a superimposed image;

means for analyzing the video image during display of the computer image and detecting virtual touches to any of the plurality of touch points; and object displaying means for displaying, when the detecting means detects the virtual touches that are made sequentially on the predetermined plurality of touch points, an object that connects the touch points sequentially subjected to the virtual touches in accordance with the computer predetermined order.

14. An input interface controlling method for an information processor having a computer image producing part, an image input part, a superimposed image producing part, and a determining part, the method comprising the steps of:

producing, by the computer image producing part, a unitary computer image of a plurality of touch points with computer generated prompts guiding a player to a predetermined plurality of such touch points to be virtually touched in a computer predetermined order;

accepting, by the image input part, an input of a video image of the player picked up by image pickup means;

superimposing, by the superimposed image producing part, the video image and the computer image on one another and causing a display device to display a superimposed image;

analyzing, by the determining part, the video image during display of the computer image and detecting virtual touches to any of the plurality of touch points; and displaying, by the computer image producing part, when the virtual touches are detected to have been made sequentially on the predetermined plurality of touch points, an object that connects the touch points sequentially subjected to the virtual touches in accordance with the predetermined order.

\* \* \* \* \*